Patented Jan. 2, 1940

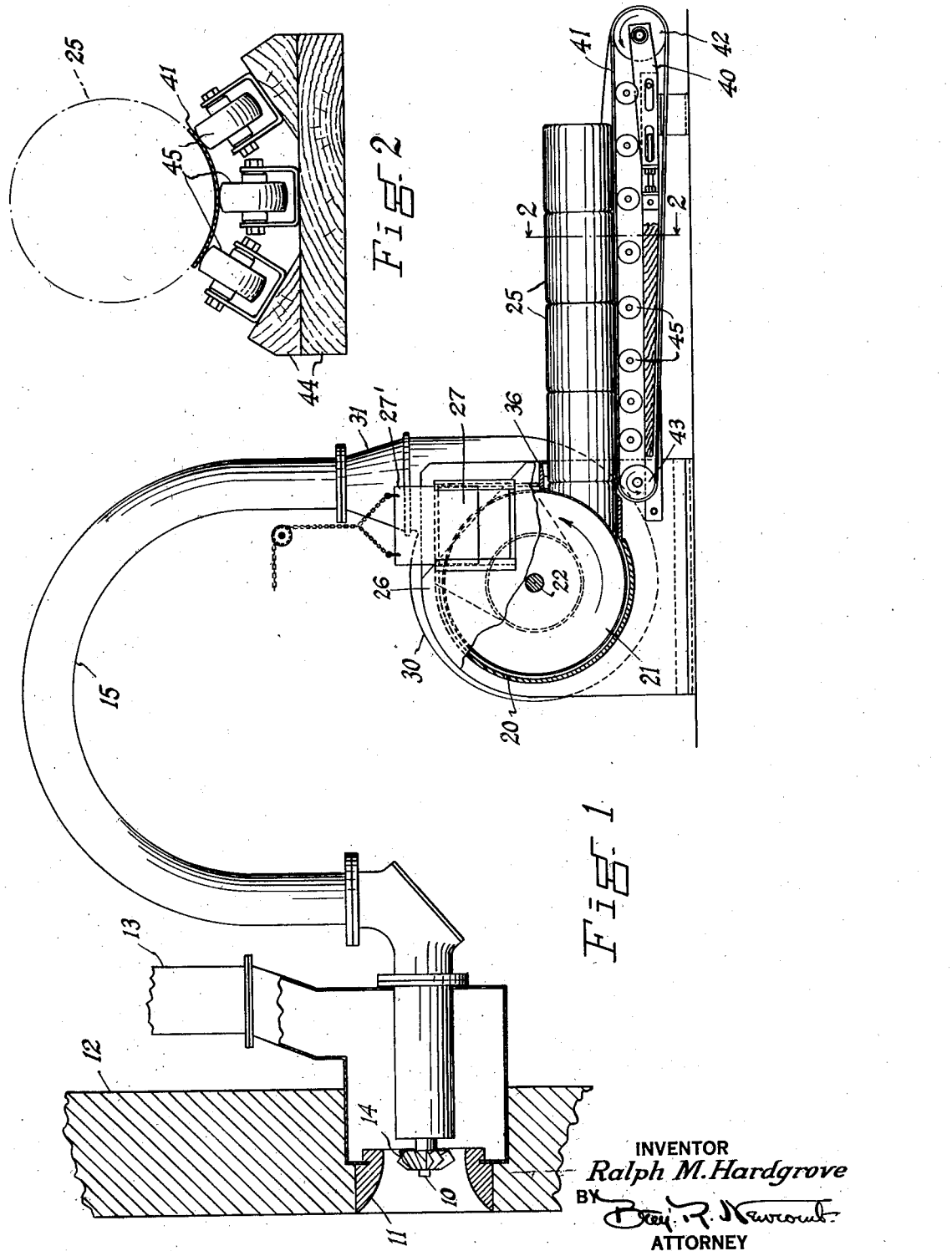

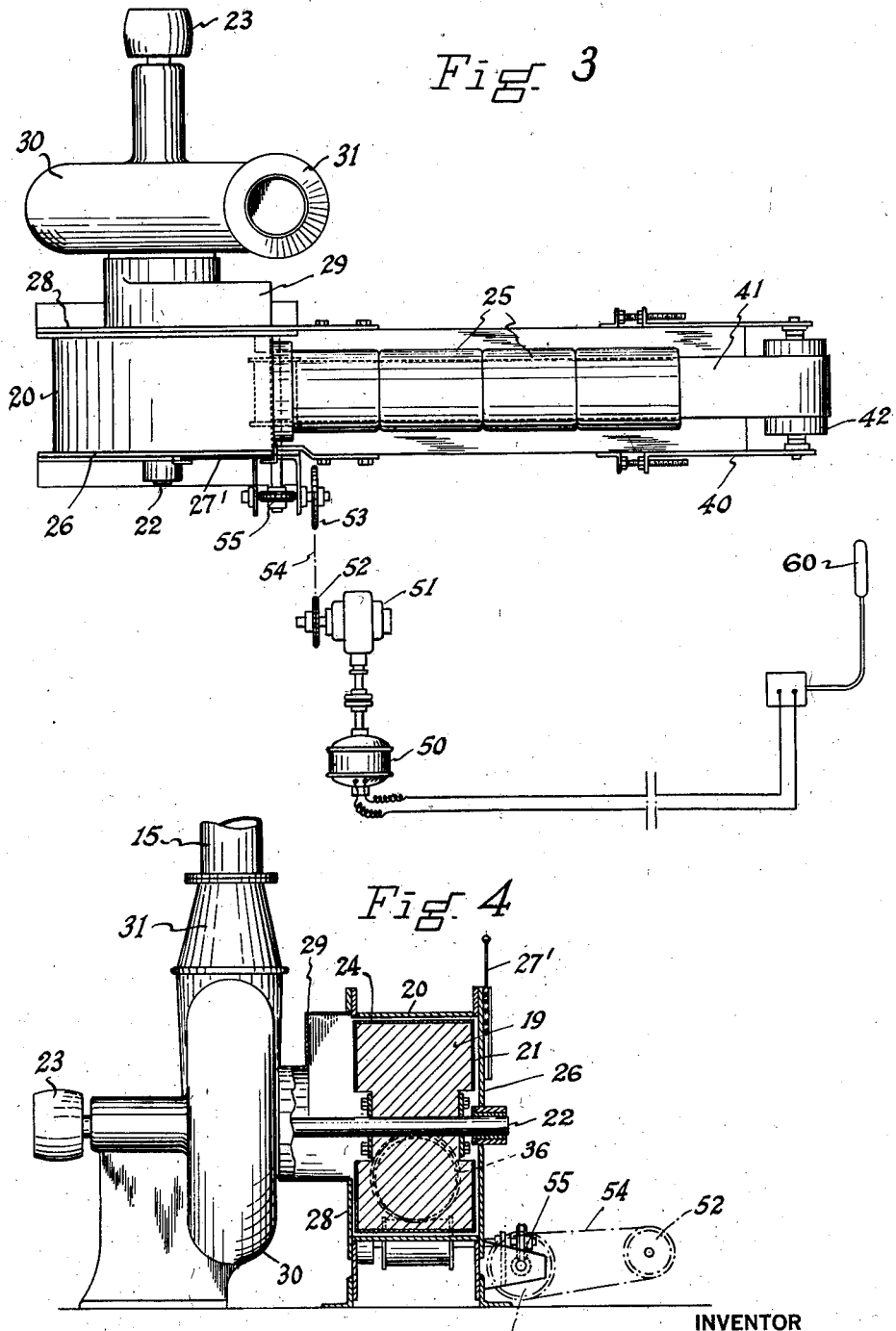

2,185,459

UNITED STATES PATENT OFFICE 2,185,459

FUEL PULVERIZING APPARATUS

Ralph M. Hardgrove, Westfield, N. J., assignor to The Babcock & Wilcox Company, Newark, N. J., a corporation of New Jersey Application March 22, 1933, Serial No. 662,015. Renewed August 6, 1938

13 Claims. (Cl. 83—93)

My present invention relates to a method of and apparatus for adapting carbonaceous fuel briquets for use in a pulverized fuel burning furnace.

While pulverized fuel firing has been extensively applied to steam boilers of moderate and large capacity, it has not been applied to the same extent to many other types of furnaces wherein it is particularly advantageous as regards ease of control and cost when compared with other widely used fuels, such as gas and oil. The application of pulverized fuel firing to industrial heating furnaces, domestic heating appliances, small heating boilers, marine and locomotive boilers, for example, has been retarded by the high cost, weight or size of present commercial coal pulverizers, the lack of suitability of such apparatus for small capacities, the bulk and difficulties of pulverized coal storage, or the objectionable features of transportation and handling of pulverized coal prepared in a central pulverizing plant. One method of treating fuel to permit its shipment over great distances and subsequent use in pulverized fuel furnaces is disclosed in the Brandes patent, 1,571,621, granted Feb. 2, 1926, in which the fuel is first comminuted and then pressed into briquets, the briquets having only sufficient coherence and solidity imparted to them to enable them to withstand the shocks of transportation, but permitting their ready repulverization at the point of use. This property is given the briquets by suitable control of the temperature and amount of binder employed during the briquetting operation. I have found that briquets can be made for use substantially in accordance with the Brandes process in a variety of sizes and shapes, for example, from pellets to cylinders approximately eight inches in diameter and twelve inches in length, or larger, and that the larger size briquets are more easily handled and more effectively pulverized.

The object of the present invention is the provision of an improved apparatus for adapting briquets of the character described for use as fuel for a pulverized fuel burning furnace. A more specific object is the provision of a pulverizing and feeding unit characterized by its effectiveness in operation, simplicity of construction, ease of control, compactness, adaptability to any heating appliance, and relatively low cost of manufacture.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Of the drawings:

Fig. 1 is an elevation, partly in section, of a pulverizing and feeding unit constructed in accordance with my invention;

Fig. 2 is a section on the line 2—2 of Fig. 1;

Fig. 3 is a partly diagrammatic plan view of a portion of the apparatus of Fig. 1; and Fig. 4 is an end view, partly in section, of the apparatus of Fig. 3.

The pulverizing and feeding unit illustrated is arranged to supply comminuted fuel to a pulverized fuel burner 10 mounted in a burner opening 11 in one wall of a furnace 12. The fuel burner 10 may be of any suitable form, such as that conventionally illustrated in Fig. 1, having a secondary air supply conduit 13 and a directing device 14 for the pulverized fuel and primary or carrier air. A mixture of comminuted fuel and primary air is delivered in operation to the fuel burner 10 through a pipe 15 connected to the pulverizing and feeding unit hereinafter described.

The pulverizing and feeding unit shown has a substantially cylindrical casing 20 forming a pulverizing chamber, within which a grinding wheel 21 of slightly less diameter is mounted on a shaft 22 driven through a driving pulley 23 by any suitable source of power. The grinding wheel 21 is formed by a cylinder 19 having its circumferential surface covered or coated with an abrasive material, such as sheets of emery cloth 24, suitably attached thereto. Briquets 25, formed as hereinafter described, are preferably pressed into contact with a circumferential portion of the grinding wheel with the line of feed substantially displaced from the axis of the wheel. When, as indicated in Fig. 1, the grinding wheel is arranged to rotate in a counterclockwise direction and the air ports arranged as hereinafter described, the briquets are preferably fed so that the whole briquet is pressed against the circumferential surface of the lower right hand quadrant of the grinding wheel. With this arrangement, the portion of the casing 20 surrounding the upper right hand quadrant of the wheel is squared off, as shown in Fig. 1, to form an air and fuel mixing chamber, into which air enters through a triangular port 27 formed by cutting away the corner of the outer end plate 26 of the casing 20. The amount of air entering the port 27 is advantageously regulated in accordance with the rate of grinding by a vertically slidable damper 27', which may be held in any position to which it may be moved by any suitable type of damper regulating device. The inner end plate 28 of the casing 20 is cut away both centrally and in its upper right hand quadrant, as seen in Figs. 3 and 4, to provide communication between the mixing chamber and a connecting box 29, corresponding in cross-section to the cut-away portion of the plate 28. The opposite end of the box has a circular outlet coaxial with the axis of the shaft 22 and connected to the inlet of a centrifugal fan mounted on the shaft 22 within a circular casing 30. The fan has a tangential outlet 31 connected to the pipe 15.

The pulverizing apparatus described is especially adapted for repulverizing large size briquets of comminuted fuel of cylindrical form. The briquets are preferably passed into contact with the grinding surface of the wheel 21 by feeding mechanism including a horizontally arranged endless conveyor 40, from which the briquets pass into a flanged inlet opening 36 in the casing 20 corresponding in form and slightly greater in size than the cross-sectional area of the briquets. The conveyor 40 includes an endless belt 41 carried by spaced pulleys 42 and 43, which are adjustably mounted on a base 44. Rollers 45, arranged in sets of three, are positioned at longitudinally spaced points below the upper run of the belt 41 to provide a transverse curvature in the upper run of the belt corresponding to the curvature of the briquets 25 carried thereby, as shown in Fig. 2. The conveyor is driven from a variable speed electric motor 50 through a speed reducing mechanism 51, sprocket wheels 52 and 53 connected by a chain 54, and a worm drive connection 55 from the sprocket wheel 53 to the shaft of the belt driving pulley 43, as shown in Fig. 3. The speed of the motor 50, and thereby the rate of progression of the briquets, may be controlled automatically through a control device 60, arranged to be responsive either to the temperature of the furnace or to the temperature or pressure of the material heated. With the grinding wheel rotating at a constant speed, the rate of combustion may be controlled by simply varying the rate of feeding the briquets, as the grinding capacity of the grinding wheel is much greater than that required in the normal range of operation. The damper control of the air supply may be supplemented or replaced by controlling the speed of the shaft 22 and thereby the fan effect.

With the apparatus constructed as described, the briquets to be pulverized are positioned in a row on the upper run of the conveyor and successively pressed into contact with the grinding surface of the wheel 21 by the movement of the conveyor. The rapidly rotating grinding wheel continuously grinds off the abutting surface of the briquet. The rotation of the grinding wheel opposes the briquet pressure induced by the feeding mechanism, and contributes to uniform grinding of the briquets. The pulverized fuel is thrown upward into the mixing chamber, in which it mixes with and is swept up by the air current created by the centrifugal fan across the mixing chamber. The air with the pulverized material in suspension passes out through the connecting box 29 to the fan, from which the air and fuel mixture is discharged through the tangential outlet 31 and pipe 15. The pipe 15 delivers the mixture directly to the fuel burner 10, from which it enters the furnace along with a regulated supply of secondary air from the conduit 13. The described arrangement of the conveyor relative to the grinding wheel insures a uniform grinding of the entire briquet regardless of the size of the unground portion of the briquet in contact with the grinding wheel. The formation of the briquets of cylindrical shape with the corners between the end and circumferential surfaces rounded has been found especially suitable for pulverization by a grinding wheel of the character described. With other relative arrangements of the parts, I have found it difficult to uniformly feed and grind the rear end portions of the briquets. With a pulverizing unit of the character described, the fineness of the repulverized fuel will be substantially higher than that of the pulverized fuel used in forming the briquets.

While in accordance with the provisions of the statutes I have illustrated and described herein the best form of my invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. Apparatus for pulverizing fuel briquets comprising, a rotary grinding wheel having a continuous circumferential grinding surface and arranged to rotate about a horizontal axis, a casing enclosing said grinding wheel and closely surrounding the circumferential grinding surface thereof, a briquet inlet opening in said casing opposite and adjacent to the circumferential grinding surface of a lower upwardly moving quadrant of said grinding wheel, conveying means externally of said casing constructed to gravitationally support and continuously feed a row of fuel briquets of uniform size and shape and arranged end to end through said inlet opening into contact with said circumferential grinding surface, an air and fuel mixing space in said casing above said lower upwardly moving grinding wheel quadrant and arranged to receive pulverized fuel from the grinding zone, and fan means causing a stream of carrier air to pass through said air and fuel mixing space and sweep up pulverized material therein.

2. Apparatus for pulverizing fuel briquets comprising, a rotary grinding wheel having a continuous circumferential grinding surface and arranged to rotate about a horizontal axis, a casing enclosing said grinding wheel and closely surrounding the circumferential grinding surface thereof, a briquet inlet opening in said casing opposite and adjacent the circumferential grinding surface of a lower upwardly moving quadrant of said grinding wheel, said inlet opening having a shape and cross-sectional area conforming to the briquets to be pulverized and its axis offset from the axis of said grinding wheel, conveying means externally of said casing for continuously feeding a row of fuel briquets arranged end to end through said inlet opening into contact with said circumferential grinding surface, an air and fuel mixing space in said casing opposite the upper upwardly moving quadrant of said grinding wheel, fan means causing a stream of carrier air to pass across the circumferential surface of said grinding wheel and through said air and fuel mixing space to sweep up pulverized fuel therein, and means for regulating the supply of carrier air in accordance with the rate of pulverization.

3. Apparatus for pulverizing pulverized fuel briquets comprising a casing, a rotary grinding wheel in said casing having a continuous circumferential grinding surface, means for gravitationally supporting and feeding a row of fuel briquets of uniform size and shape and arranged end to end into contact with a portion of the grinding surface of said wheel moving in operation through an arc in a direction counter to the direction of briquet feed comprising a horizontally arranged endless conveyor, an air and fuel mixing chamber in a corner of said casing above the grinding zone, air inlet and outlet ports at opposite sides of said mixing chamber, and an exhaust fan connected to said outlet port.

4. Apparatus for pulverizing fuel briquets comprising a rotary grinding wheel having a continuous circumferential grinding surface, means constructed to gravitationally support and continuously feed a row of fuel briquets of uniform size and shape and arranged end to end into grinding contact with said grinding surface comprising endless belt conveying means, said grinding wheel and feeding means being relatively arranged so as to have the axis of said row of briquets offset from the axis of rotation of said wheel and one end of the innermost briquet wholly in contact with a portion of said grinding surface moving in operation through an arc in a direction counter to the direction of briquet feed while in grinding contact with the briquet, means for varying the speed of said feeding means to control the rate of grinding, an air and fuel mixing chamber receiving pulverized fuel from the grinding zone, and means for causing a stream of carrier air to pass through said air and fuel mixing space and sweep up pulverized fuel therein.

5. Apparatus for pulverizing fuel briquets comprising a rotary grinding wheel having a continuous circumferential grinding surface and arranged to rotate about a horizontal axis, a casing enclosing said grinding wheel and closely surrounding the grinding surface thereof, a briquet inlet opening in said casing opposite and adjacent to a portion of said grinding surface and arranged with its central axis offset from said grinding wheel axis and intersecting said grinding surface, said inlet opening being substantially of a shape and cross-sectional area conforming to the briquets to be pulverized, conveying means externally of said casing for continuously feeding a row of fuel briquets arranged end to end through said inlet opening into contact with said grinding surface, said grinding wheel, inlet opening and conveying means being relatively arranged so as to have the innermost briquet with one end in contact with a portion of said grinding surface moving in operation through an arc in a direction counter to the direction of briquet feed while in grinding contact with the briquet, means for varying the speed of said conveying means to control the rate of grinding, an air and fuel mixing space in said casing arranged to receive pulverized fuel from the grinding zone, and fan means causing a stream of carrier air to pass through said air and fuel mixing space and sweep up pulverized fuel therein.

6. Apparatus for pulverizing fuel briquets comprising a rotary grinding wheel having a continuous circumferential grinding surface and arranged to rotate about a horizontal axis, a casing enclosing said grinding wheel and closely surrounding the grinding surface thereof, a briquet inlet opening in said casing opposite and adjacent to a portion of said grinding surface and arranged with its central axis offset from said grinding wheel axis and intersecting said grinding surface, said inlet opening being substantially of a shape and cross-sectional area conforming to the briquets to be pulverized, conveying means externally of said casing for continuously feeding a row of elongated fuel briquets arranged end to end through said inlet opening into contact with said grinding surface, said grinding wheel, inlet opening and conveying means being relatively arranged so as to have the innermost briquet with one end in contact with a lower portion of said grinding surface moving upwardly in operation through an arc in a direction counter to the direction of briquet feed while in grinding contact with the briquet, means for varying the speed of said conveying means to control the rate of grinding, an air and fuel mixing space in said casing above and arranged to receive pulverized fuel from the grinding zone, fan means causing a stream of carrier air to pass through said air and fuel mixing space and sweep up pulverized fuel therein, and means for regulating the supply of carrier air in accordance with the rate of pulverization.

7. Apparatus for pulverizing pulverized fuel briquets comprising a rotary grinding wheel having a continuous circumferential grinding surface arranged to rotate about a substantially horizontal axis, and endless conveying means arranged to support a horizontal row of pulverized fuel briquets arranged end-to-end thereon and feed the same with the inner end of the innermost briquet of the row in grinding contact with a lower section of said circumferential grinding surface moving in operation through an arc in a direction counter to the direction of briquet feed.

8. Apparatus for pulverizing pulverized fuel briquets comprising a rotary grinding wheel having a continuous circumferential grinding surface and arranged to rotate about a substantially horizontal axis, a casing enclosing said grinding wheel and closely surrounding said circumferential grinding surface, horizontally arranged endless conveying means arranged to support a horizontal row of pulverized fuel briquets of substantially uniform density and cross-sectional area arranged end-to-end thereon and feed the same through said casing with the inner end of the innermost briquet in grinding contact with a lower section of said circumferential grinding surface moving in operation through an arc in a direction counter to the direction of briquet feed, and means for controlling the speed of said conveying means to control the rate of grinding.

9. Apparatus for pulverizing pulverized fuel briquets comprising a rotary grinding wheel having a circumferential grinding surface and arranged to rotate about a horizontal axis, a casing enclosing said grinding wheel, a briquet inlet opening in said casing opposite the circumferential grinding surface of a lower upwardly moving quadrant of said grinding wheel, conveying means for gravitationally supporting and feeding a row of fuel briquets of uniform size and shape and arranged end-to-end through said inlet opening into contact with said circumferential grinding surface, an air and fuel mixing space in said casing above said lower upwardly moving grinding wheel quadrant and arranged to receive pulverized fuel from the grinding zone, and fan means causing a stream of carrier air to pass through said air and fuel mixing space and sweep up pulverized material therein.

10. Apparatus for pulverizing pulverized fuel briquets comprising a rotary grinding wheel having a continuous circumferential grinding surface and arranged to rotate about a substantially horizontal axis, a casing enclosing said grinding wheel, conveying means arranged to gravitationally support a row of pulverized fuel briquets uniformly arranged in end-to-end relation thereon and feed the same into said casing and position the inner end of the innermost briquet in grinding contact with a section of said circumferential grinding surface moving in operation through an arc in a direction counter to the direction of briquet feed, means for controlling the speed of said conveying means to control the rate of grinding, and means for intimately mixing the repulverized fuel with air for combustion.

11. Apparatus for pulverizing pulverized fuel briquets comprising a rotary grinding wheel having a circumferential grinding surface and arranged to rotate about a substantially horizontal axis, conveying means arranged to gravitationally support a row of pulverized fuel briquets arranged end-to-end thereon and feed the same with the inner end of the innermost briquet in grinding contact with a section of said circumferential grinding surface continuously moving in operation through an arc in a direction counter to the direction of briquet feed, means for controlling the speed of said conveying means to control the rate of grinding, and means for intimately mixing the repulverized fuel with air for combustion.

12. Apparatus for pulverizing pulverized fuel briquets comprising a rotary grinding wheel having a continuous circumferential grinding surface and arranged to rotate about a substantially horizontal axis, horizontally arranged endless belt conveying means arranged to gravitationally support a pulverized fuel briquet and feed the same with its inner end in grinding contact with a section of said circumferential grinding surface below the level of said grinding wheel axis and moving in operation through an arc in a direction counter to the direction of briquet feed, and means for controlling the speed of said conveying means to control the rate of grinding.

13. Apparatus for pulverizing pulverized fuel briquets comprising a rotary grinding wheel having a continuous circumferential grinding surface and arranged to rotate about a substantially horizontal axis, horizontally arranged endless belt conveying means arranged to gravitationally support a pulverized fuel briquet and feed the same with its inner end in grinding contact with a lower section of said circumferential grinding surface moving in operation through an arc in a direction counter to the direction of briquet feed, and means for intimately mixing the repulverized fuel with air for combustion.

RALPH M. HARDGROVE.